United States Patent Office 3,141,046
Patented July 14, 1964

3,141,046
PRODUCTION OF CUMENE HYDROPEROXIDE
Georges Bichet and Georges Poilane, Lyon, France, assignors to Societe des Usines Chimiques Rhone-Poulenc, Paris, France, a body corporate of France
No Drawing. Filed Dec. 14, 1959, Ser. No. 859,115
Claims priority, application France Dec. 17, 1958
7 Claims. (Cl. 260—610)

This invention relates to the production of cumene hydroperoxide by the oxidation of cumene in homogeneous liquid phase.

In the oxidation of hydrocarbons to hydroperoxides by the action of molecular oxygen, there are frequently formed, in side reactions, acid substances which are harmful to the reaction. It has long been known to minimise or avoid this harmful effect by neutralising the acid by-products by means of bases. This measure has also been applied to the preparation of cumene hydroperoxide, which is particularly sensitive to the action of acids. For this purpose, caustic soda or sodium carbonate is generally employed, but it has also been proposed to use alkali salts of weak organic acids, for example acids which form soaps. The conventional agents, i.e. caustic soda or sodium carbonate, have only a very weak action on the speed of oxidation.

According to the present invention there is provided a process for the production of cumene hydroperoxide which comprises oxidising cumene with molecular oxygen as a homogeneous liquid phase reaction in the presence of an alkali salt of a carboxylic acid of the general formula:

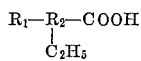

wherein $R_1$ represents an alkyl or aryl group and $R_2$ represents a straight- or branched-chain trivalent saturated aliphatic hydrocarbon group. It has been found that the aforesaid salts are remarkably effective catalysts for the oxidation of cumene to give hydroperoxide.

In the aforesaid general formula the ethyl group may be attached to a carbon atom adjacent the carboxyl group or to a carbon atom further removed therefrom.

Such alkali metal salts are, for example, the alkali salts of 2-ethylbutyric acid, 2-ethylhexanoic acid, 4-ethylhexanoic acid, 3-ethylheptanoic acid and 2-phenyl-2-ethylacetic acid. The salts of 2-ethylhexanoic acid are particularly suitable.

The expression "speed of oxidation" is used to mean the amount of cumene hydroperoxide formed per unit time. In the following description reference is made to a "mean speed of oxidation" which is calculated in the following manner: cumene is oxidised to an extent of about 25% by blowing in oxygen and the exact amount of hydroperoxide obtained is divided by the number of hours, taken after deducting the time taken for initiation of the reaction. It is known that the speed of oxidation is very slow until a certain amount of hydroperoxide has been formed. When this minimum amount has been reached, the reaction progresses at increasing speed. To calculate the mean speed of oxidation, therefore, this time of initiation is deducted and the duration is measured from the point at which an arbitrarily chosen amount of about 3% of hydroperoxide has been formed.

The optimum oxidation temperature is about 110° C. As alkali salts, there may be employed potassium salts or sodium salts, the latter being preferable. These salts are advantageously introduced into the medium in the form of aqueous solutions, for example in a concentration of 25%. At the oxidation temperature of 110° C., the water evaporates immediately. The alkali salts of acids of the aforesaid general formula are completely soluble in cumene at elevated temperature, so that exact dosaging and a good distribution in the medium are possible.

In the following Table I, there are given (column 4) the mean speeds of oxidation obtained with the sodium salts of a series of acids substituted by ethyl groups, for different dosages as indicated in column 2, and they are compared with those obtained with caustic soda and sodium carbonate. In order to permit a better comparison, the sodium ion concentration in the medium is also indicated (column 3). In column 5 are given the ratios of the speeds, the speed corresponding to sodium carbonate being taken as 100. Column 6 gives the percentages of hydroperoxide formed in the medium after distillation of the unoxidised cumene. They correspond substantially to the yield, that is to say, to the percentage of cumene oxidised to hydroperoxide in relation to the total oxidised cumene. Finally, in the last column, there is indicated the rate of production, that is to say, the quantity of hydroperoxide that a given volume of apparatus can produce per unit time, the production in the presence of sodium carbonate being given the value 100.

Table I

| (1) | (2) Mg./kg. of cumene | (3) Mg. of Na ions per kg. of cumene | (4) Mean speed of oxidation | (5) Speed ratio | (6) Yield | (7) Rate of production |
|---|---|---|---|---|---|---|
| Sodium carbonate | 185 | 80 | 6.0 | 100 | 94.8 | 100 |
| Caustic soda | 140 | 80 | 6.9 | 115 | 90.2 | 110 |
| 2-ethyl butyrate | 480 | 80 | 9.5 | 158 | 89.4 | 149 |
| 2-ethyl hexanoate | 576 | 80 | 10.5 | 175 | 89.9 | 166 |
| 4-ethyl hexanoate | 576 | 80 | 8.2 | 137 | 90.7 | 131 |
| 3-ethyl heptanoate | 626 | 80 | 9.5 | 158 | 90.4 | 150 |
| 2-phenyl-2-ethyl acetate | 646 | 80 | 9.4 | 156 | 90.4 | 148 |

It will be apparent from this table that the alkali salts of the carboxylic acids of the aforesaid general formula give mean speeds of oxidation which are distinctly higher than those obtained with the catalysts hitherto employed.

Sodium 2-ethylhexanoate gives particularly interesting results. A study of the speed of oxidation of cumene to hydroperoxide, as a function of the amount of sodium 2-ethylhexanoate, gives the following results:

Table II

| | Mg./kg. of cumene | Mg. of Na ions per kg. of cumene | Mean speed of oxidation | Speed ratio | Yield | Rate of production |
|---|---|---|---|---|---|---|
| Sodium 2-ethyl hexanoate | 288 | 40 | 11 | 183 | 89.9 | 174 |
| Do | 72 | 10 | 7.8 | 130 | 93.3 | 128 |
| Do | 36 | 5 | 7.3 | 121 | 93.9 | 120 |

It will be seen that with amounts of sodium 2-ethylhexanoate as small as 36 mg. per kilo of cumene, the mean speed of oxidation is 21% higher than that obtained when employing sodium carbonate and 5% higher than in the case of caustic soda, and that when the sodium 2-ethylhexanoate concentration is raised to 288 mg. the mean speed of oxidation exceeds by 83% that obtained with sodium carbonate and by 60% that obtained with caustic soda. The increase in speed is therefore considerable.

With small proportions of sodium 2-ethylhexanoate, the yield is slightly lower than with sodium carbonate (−0.9%), but higher than in the case with caustic soda (+3.7%). With an amount of 288 mg. of sodium 2-ethylhexanoate, the yield is lower than that obtained in tests in which these other two alkaline substances are employed (−4.9% and −0.3%), but this is largely compensated for by the speed of oxidation, since the cost of the raw material, i.e. cumene, accounts for a relatively small proportion of the cost of the phenol obtained by oxidation of the cumene as compared with the cost of the manufacture and the amortization of the installations. It will be seen from the last column that an installation designed to manufacture, for example, 100 tons of hydroperoxide per day using sodium carbonate or 110 tons with caustic soda can produce 174 tons with sodium 2-ethylhexanoate.

The following Table III shows comparative results obtained with sodium salts of aliphatic and cyclic carboxylic acids, unsubstituted (a) and substituted by methyl groups (b). The concentrations are so chosen that there are uniformly 80 mg. of sodium ions per kg. of cumene.

*Table III*

|  | Mg./kg. of cumene | Mean speed of oxidation | Yield |
|---|---|---|---|
| (a) Acetate | 285 | 5.2 | 95 |
| Butyrate | 383 | 5.5 | 93.8 |
| n-Octanoate | 577 | 5.9 | 94.3 |
| Laurate | 765 | 5.3 | 93.9 |
| Stearate | 1,064 | 8 | 93.2 |
| Oleate | 1,057 | 5.7 | 94.5 |
| Naphthenate | 1,120 | 7.3 | 90.8 |
| (b) Isobutyrate | 383 | 5.2 | 95.1 |
| Trimethylacetate | 431 | 5.9 | 92.4 |
| Isovalerate | 431 | 6.9 | 91.6 |

It will be apparent from these experiments that all the salts except two give mean speeds of oxidation of the same order as caustic soda and sodium carbonate. Sodium stearate and sodium naphthenate give speeds in the neighbourhood of those obtained in the case of the alkali salts of the aforesaid general formula, but these two salts have two major disadvantages by which their industrial use is excluded: on the one hand, they produce a considerable foam formation at the beginning of the oxidation of the cumene, which renders the oxidation very difficult to perform, if not impossible, while on the other hand, since they are not soluble in cumene, in contrast to the salts employed in accordance with the present invention, they form deposits of gels on the walls of the installations.

It will also be apparent from the table that sodium-n-octanoate, which is the isomer of ethylhexanoates, does not produce any increase in the speed of oxidation. This is true also in the case of carboxylic acid salts comprising methyl substituents. The improvement is therefore specific to acids having the characteristic ethyl substitution, and is independent of the alkali ion.

In all the foregoing examples the oxidation was effected by blowing oxygen into a body of cumene containing the alkali metal salt, at 110° C.

We claim:
1. A process for the production of cumene hydroperoxide which comprises oxidizing cumene by treatment at elevated temperature with molecular oxygen as a homogeneous liquid phase reaction in the presence of an alkali metal salt of a carboxylic acid of formula:

$$R_1-R_2-COOH$$
$$|$$
$$C_2H_5$$

where $R_1$ represents a group selected from the class consisting of straight chain alkyl groups of 2 to 4 carbon atoms and phenyl and $R_2$ represents a trivalent aliphatic hydrocarbon radical in which the carbon atom directly linked to the ethyl radical is also directly linked to $R_1$ and selected from the class consisting of the radicals of formulae:

$$-CH-,\ -CH-CH_2-$$

and $$-CH-CH_2-CH_2-$$

the said alkali metal salt being used in amount sufficient to substantially promote the rate of oxidation of the said cumene.

2. A process according to claim 1 wherein the said salt is an alkali metal salt of 2-ethylbutyric acid.
3. A process according to claim 1 wherein the said salt is an alkali metal salt of 2-ethylhexanoic acid.
4. A process according to claim 1 wherein the said salt is an alkali metal salt of 4-ethylhexanoic acid.
5. A process according to claim 1 wherein the said salt is an alkali metal salt of 3-ethyl-heptanoic acid.
6. A process according to claim 1 wherein the said salt is an alkali metal salt of 2-phenyl-2-ethylacetic acid.
7. A process for the production of cumene hydroperoxide which comprises oxidizing cumene by blowing molecular oxygen through a body of cumene at 110° C. as a homogeneous liquid phase reaction in the presence of an alkali metal salt of a carboxylic acid of formula:

$$R_1-R_2-COOH$$
$$|$$
$$C_2H_5$$

where $R_1$ represents a group selected from the class consisting of straight chain alkyl groups of 2 to 4 carbon atoms and phenyl and $R_2$ represents a trivalent aliphatic hydrocarbon radical in which the carbon atom directly linked to the ethyl radical is also directly linked to $R_1$ and selected from the class consisting of the radicals of formulae:

$$-CH-,\ -CH-CH_2-$$

and $$-CH-CH_2-CH_2-$$

the said alkali metal salt being used in amount sufficient to substantially promote the rate of oxidation of the said cumene.

References Cited in the file of this patent

UNITED STATES PATENTS

| 2,663,740 | Calhoun et al. | Dec. 22, 1953 |
| 2,681,937 | Mosnier et al. | June 22, 1954 |
| 2,796,439 | Berneis | June 18, 1957 |